US009462385B2

(12) United States Patent
Perez et al.

(10) Patent No.: US 9,462,385 B2
(45) Date of Patent: Oct. 4, 2016

(54) SPEAKER SYSTEM SUCH AS A SOUND BAR ASSEMBLY HAVING IMPROVED SOUND QUALITY

(71) Applicant: JVIS-USA, LLC, Sterling Heights, MI (US)

(72) Inventors: Alexis A. Perez, Rochester Hills, MI (US); Jason T. Murar, Macomb, MI (US); Michael G. Froude, Fraser, MI (US)

(73) Assignee: JVIS-USA, LLC, Sterling Heights, MI (US)

( * ) Notice: Subject to any disclaimer, the term of this patent is extended or adjusted under 35 U.S.C. 154(b) by 585 days.

(21) Appl. No.: 13/852,130

(22) Filed: Mar. 28, 2013

(65) Prior Publication Data

US 2014/0294195 A1 Oct. 2, 2014

(51) Int. Cl.
*G06K 9/00* (2006.01)
*H04R 5/02* (2006.01)

(52) U.S. Cl.
CPC ............. *H04R 5/02* (2013.01); *H04R 2499/13* (2013.01)

(58) Field of Classification Search
None
See application file for complete search history.

(56) References Cited

U.S. PATENT DOCUMENTS 4,056,165 A * 11/1977 Okamoto et al. ............. 181/141
4,582,162 A * 4/1986 Katsuno ........................ 181/141
4,673,056 A * 6/1987 Koppelomaki ............... 181/141
5,094,316 A 3/1992 Rosen
5,532,437 A 7/1996 Simplicean et al.
5,546,468 A * 8/1996 Beard ................. B60R 11/0217 181/145
5,606,623 A * 2/1997 Bahm et al. .................... 381/86
5,646,381 A 7/1997 Boyte, Jr.
5,920,039 A * 7/1999 Cote et al. .................... 181/141
5,979,590 A * 11/1999 Telmos ......................... 181/141
6,076,885 A 6/2000 Curtindale et al.
D469,421 S 1/2003 Stickles et al.
6,690,802 B2 2/2004 Stickles et al.
7,984,738 B2 7/2011 Lamarca et al.
2009/0314770 A1 12/2009 Lamarca et al.
2010/0072742 A1* 3/2010 Lamarca et al. ............. 285/21.2

OTHER PUBLICATIONS

Yamaha. "Yamaha Product Preview YAS-201". Aug. 31, 2012. pp. 1-5.*

* cited by examiner

*Primary Examiner* — Curtis Kuntz
*Assistant Examiner* — Kenny Truong
(74) *Attorney, Agent, or Firm* — Brooks Kushman P.C.

(57) ABSTRACT

A speaker system such as a sound bar assembly having a plurality of speaker units and improved sound quality is provided. Opposing mating portions of front and back panels of the assembly or system are fused or welded together to form outer boundary and interior joints where the front and back panels are welded together. The front and back panels are spaced apart at their first and second ends to define first and second speaker compartments, respectively, separated by a central compartment. A speaker unit is positioned in each of the speaker compartments. The speaker compartments are acoustically isolated from one another by the interior joints to improve the sound quality.

19 Claims, 5 Drawing Sheets

SPEAKER SYSTEM SUCH AS A SOUND BAR ASSEMBLY HAVING IMPROVED SOUND QUALITY

TECHNICAL FIELD

This invention generally relates to sound or speaker systems and, in particular, to sound or speaker systems such as sound bar assemblies having a plurality of speaker units.

OVERVIEW

Speaker systems or devices configured to transmit audible sound are known to be constructed in various configurations. All speaker devices have some form of transducing device typically mounted in a chassis or enclosure.

One role of the enclosure is to prevent sound waves generated by the rearward-facing surface of the diaphragm of an open driver from interacting with sound waves generated at the front of the driver. Because the forward- and rearward-generated sounds are out of phase with each other, any interaction between the two in the listening space creates a distortion of the original signal as it was intended to be reproduced. Additionally, because they travel different paths through the listening space, the sound waves arrive at the listener's position at slightly different times, introducing echo and reverberation effects not part of the original sound.

The enclosure also plays a role in managing vibration induced by the driver frame and moving airmass.

Speaker systems are also known to include multiple speakers some of which are selected to broadcast in particular frequency ranges. That is, it is known that audible sound occurs primarily in a frequency range from about 20 cycles per second to about 20,000 cycles per second. Those skilled in the art will recognize that to get better quality sound, the speakers (transducing devices) are typically constructed to produce sound in different ranges. Thus, transducing speakers can be constructed in a variety of ways to broadcast sound in different ranges which vary based on the transducing speaker, cost, space, audience, and the like. Some transducing speakers are referred to as a mid-range, high frequency (HF), low frequency or bass and the like. The exact frequency range will vary based on a variety of factors. However, low frequency or bass speakers typically produce sound from about 40 to 60 hertz (Hz) to about 450 to 500 Hz; mid-range speakers produce sound from around 70 Hz to 100 Hz to about 3000 Hz, and HF speakers typically produce sound from around 3000 Hz to 3500 Hz to above 20,000 Hz. In other words, while the frequency range for bass, mid-range and HF differ, they may and typically do overlap.

High performance automotive speakers are often mounted within plastic speaker enclosures such that sound waves radiating from the front of the speaker diaphragm enter the passenger compartment of the vehicle while sound waves emanating from the back of the speaker diaphragm enter the enclosure. For an automotive speaker to deliver accurate sound reproduction, especially in the low frequency ranges, it is important that the speaker enclosure be rigid enough to resist vibrating in response to the motion of the vehicle and the sound waves generated by the back of the speaker diaphragm. This rigidity requirement represents a significant design challenge in the manufacture of light weight, low cost speaker enclosures. Whereas thin-walled enclosures are desirable from a cost and weight standpoint, care must be taken to ensure that the enclosure walls are adequately reinforced against vibration so that the sound quality of the system is not compromised.

Many conventional automotive speaker enclosures are made from injection molded plastic material. The injection molding process allows the thickness of the enclosure walls to be varied such that thicker wall sections may be provided in areas such that thicker wall sections may be provided in areas of the enclosure that would otherwise be susceptible to vibration.

Despite the design flexibility offered by injection molding, however, the method has several drawbacks with respect to speaker enclosure manufacture. For example, it is difficult to ensure an airtight seal between the enclosure pieces because of part shrinkage, part twisting, and the irregular complex, 3-D shapes of many speaker enclosure designs. In the absence of an airtight seal between the pieces, the speaker enclosure will not function as intended.

U.S. Pat. No. 5,532,437 discloses a speaker assembly for a motor vehicle in which a single speaker is mounted to a blow molded enclosure.

Speaker boxes including multiple speakers are commonly mounted to the sports bar of sport utility vehicles to provide music and other audio entertainment for the driver and passengers. Such speaker boxes are typically mounted to extend across the sports bar in a horizontal position. One problem of blow molded speaker boxes is that it is difficult, if not impossible, to manufacture internal features in such enclosures to isolate or acoustically decouple the compartments in which the various speakers are mounted, especially if the speakers are located some distance from each other.

The following U.S. patent documents are related to at least one embodiment of the present invention: U.S. Pat. Nos. 5,094,316; 5,532,437; 5,646,381; 5,979,590; 6,076,885; 6,690,802; 7,984,738; 2009/0314770; 2010/0072742; and D469421.

Despite the prior art noted above, there is still a need for a speaker system such as a sound bar assembly having improved sound quality, low weight, design flexibility and capable of being mass produced at a relatively low price.

SUMMARY OF EXAMPLE EMBODIMENTS

An object of at least one embodiment of the present invention is to provide a light weight, thin-walled, compact speaker system such as sound bar assembly having improved sound quality and is capable of being manufactured at high production rates for markets such as the sport utility vehicle market.

In carrying out the above object and other objects of at least one embodiment of the present invention, a speaker system having a plurality of speaker units and improved sound quality is provided. The system includes a front panel having inner and outer surfaces and a plurality of mating portions including an outer boundary mating portion formed about the perimeter of the front panel. A first interior mating portion extends between opposite sides of the outer boundary mating portion at a first end of the front panel and a second interior mating portion extending between opposite sides of the outer boundary mating portion at a second end of the front panel. The front panel has a first sound opening at the first end and a second sound opening at the second end. The system also includes a back panel having inner and outer surfaces and a plurality of mating portions that oppose corresponding mating portions of the front panel. The mating portions of the back panel include an outer boundary mating portion formed about the perimeter of the back panel, a first interior mating portion extending between opposite sides of the outer boundary mating portion of the back panel at a first end of the back panel, and a second interior mating portion extending between opposite sides of the outer boundary mating portion of the back panel at a second end of the back panel. Opposing mating portions of the front and back panels are fused or welded together to form outer boundary and interior joints where the front and back panels are joined. The front and back panels are spaced apart at their first and second ends to define first and second speaker compartments, respectively, separated by a central compartment. The system still further includes a first speaker unit positioned in the first speaker compartment and mounted to transmit sound through the first sound opening and a second speaker unit positioned in the second speaker compartment and mounted to transmit sound through the second sound opening. The speaker compartments are acoustically isolated from one another by the interior joints.

Each of the compartments may be air or pressure-tight to acoustically isolate the speaker compartments.

The front panel may be formed as a unitary molded part from a thermoplastic in an injection molding process. The back panel may be formed as a unitary molded part from a thermoplastic in an injection molding process. The thermoplastic of the front panel may be compatible to be electromagnetically welded with the thermoplastic of the back panel.

The mating portions of the panels may be thermoplastic mating portions. The system may further include a weld disposed in spaces between opposing mating portions of the front and back panels and being defined by a thermoplastic electromagnetic material which, when melted and placed under pressure, is caused to conform to the configuration of the spaces to bond to and secure together surfaces layers of the opposing mating portions at the spaces by polymer-to-polymer linkages.

The outer surface of the front panel may be a class-A surface and the outer surface of the back panel may be a mounting surface.

The system may further include a wiring harness disposed in the central compartment and routed to each of the speaker compartments to couple electrical audio signals to each of the speaker units.

The front panel may have first and second depressions at its outer surface at the first and second ends, respectively, of the front panel wherein the system may further include a third speaker unit positioned in the first depression and a fourth speaker unit positioned in the second depression.

The first depression may be defined by bottom and side walls which separate the first depression from the first speaker compartment.

The second depression may be defined by bottom and side walls which separate the second depression from the second speaker compartment.

The system may further include grills for covering the speaker units at the first and second ends of the front panel.

The front panel may have a recess at its outer surface between the first and second ends wherein the system may further include a light unit positioned in the recess to emit light.

The front panel may have a plurality of depressions. Each of the depressions is at least partially defined by a bottom wall having an opening. The back panel may have a plurality of openings aligned with the openings in the bottom walls when the front and back panels are joined together. The system may further include a plurality of fasteners which extend through the aligned openings to mount the system.

The panels may be fused or welded together about the aligned openings.

The system may further include a wiring harness disposed in the central compartment and routed to each of the speaker compartments and to each of the depressions to couple electrical audio signals to each of the speaker units.

Further in carrying out the above object and other objects of at least one embodiment of the present invention, a speaker system having a plurality of speaker units and improved sound quality for use in a vehicle is provided. The system includes a front panel having inner and outer surfaces and a plurality of mating portions including an outer boundary mating portion formed about the perimeter of the front panel. A first interior mating portion extends between opposite sides of the outer boundary mating portion at a first end of the front panel. The front panel has a first sound opening at the first end and a second sound opening at the second end. The system further includes a back panel having inner and outer surfaces and a plurality of mating portions that oppose corresponding mating portions of the front panel. The mating portions of the back panel include an outer boundary mating portion formed about the perimeter of the back panel, a first interior mating portion extending between opposite sides of the outer boundary mating portion of the back panel at a first end of the back panel, and a second interior mating portion extending between opposite sides of the outer boundary mating portion of the back panel at a second end of the back panel. Opposing mating portions of the front and back panels are fused or welded together to form outer boundary and interior joints where the front and back panels are joined. The front and back panels are spaced apart at their first and second ends to define first and second speaker compartments, respectively, separated by a central compartment. The system still further includes a first speaker unit positioned in the first speaker compartment and mounted to transmit sound through the first sound opening and a second speaker unit positioned in the second speaker compartment and mounted to transmit sound through the second sound opening, The speaker compartments are acoustically isolated from one another by the interior joints.

Each of the compartments may be air or pressure-tight to acoustically isolate the speaker compartments.

Still further in carrying out the above object and other objects of at least one embodiment of the present invention an overhead sound bar assembly having improved sound quality for use in a sport utility vehicle is provided. The assembly includes a front panel having inner and outer surfaces and a plurality of mating portions including an outer boundary mating portion formed about the perimeter of the front panel. A first interior mating portion extends between opposite sides of the outer boundary mating portion at a first end of the front panel and a second interior mating portion extends between opposite sides of the outer boundary mating portion at a second end of the front panel. The front panel has a first sound opening at the first end and a second sound opening at the second end. The assembly further includes a back panel having inner and outer surfaces and a plurality of mating portions that oppose corresponding mating portions of the front panel. The mating portions of the back panel include an outer boundary mating portion formed about the perimeter of the back panel, a first interior mating portion extending between opposite sides of the outer boundary mating portion of the back panel at a first end of the back panel, and a second interior mating portion extending between opposite sides of the outer boundary mating portion of the back panel at a second end of the back panel. Opposing mating portions of the front and back panels are fused or welded together to form outer boundary and interior joints where the front and back panels are joined. The front and back panels are spaced apart at their first and second ends to define first and second speaker compartments, respectively, separated by a central compartment. The assembly still further includes a first speaker unit positioned in the first speaker compartment and mounted to transmit sound through the first sound opening and a second speaker unit positioned in the second speaker compartment and mounted to transmit sound through the second sound opening. The speaker compartments are acoustically isolated from one another by the interior joints.

Each of the compartments may be air or pressure-tight to acoustically isolate the speaker compartments.

Other technical advantages will be readily apparent to one skilled in the art from the following figures, descriptions and claims. Moreover, while specific advantages have been enumerated, various embodiments may include all, some or none of the enumerated advantages.

DESCRIPTION OF EXAMPLE EMBODIMENT(S)

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
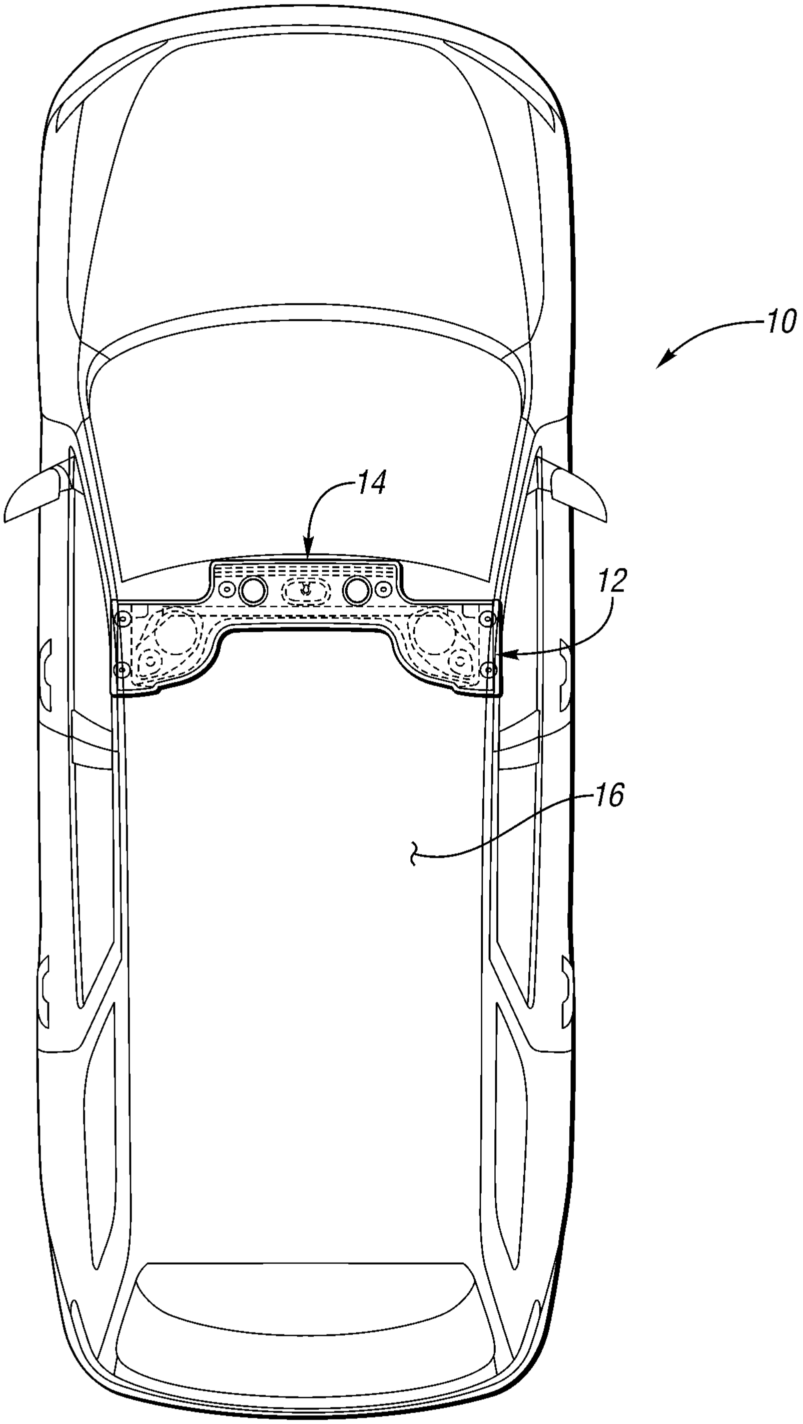
FIG. 1 is an environmental view, partially broken away, of a sport utility vehicle having a speaker system or sound bar assembly constructed in accordance with at least one embodiment of the present invention.

Referring now to FIG. 1, a sport utility vehicle generally indicated at 10, has a sound bar assembly or speaker system, generally indicated at 12, mounted against the inside surface of the vehicle roof 16 above the passenger compartment. The sound bar assembly 12 extends laterally across substantially the entire width of the vehicle roof 16.

Figure 6A:
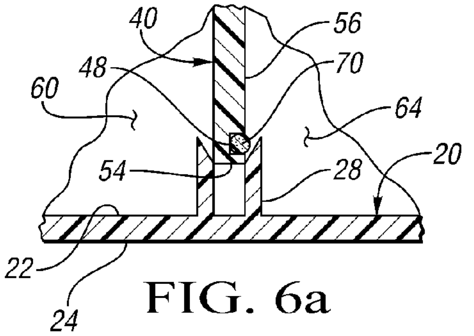
FIGS. 6*a* and 6*b* are side schematic views, partially broken away, of a different type of tongue and groove mating portions of the front and back panels prior to and after, respectively, electromagnetic welding.
Figure 6B:
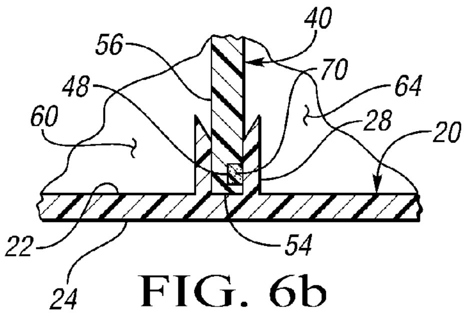
Figure 7A:
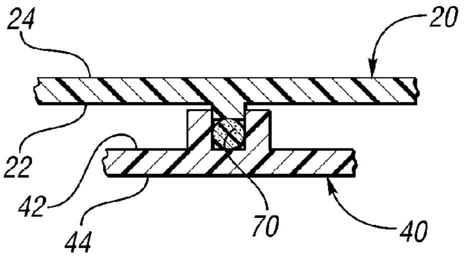
FIGS. 7*a* and 7*b* are side schematic views, partially broken away, of rib and groove mating portions of the front and back panels prior to and after, respectively, electromagnetic welding.
Figure 7B:
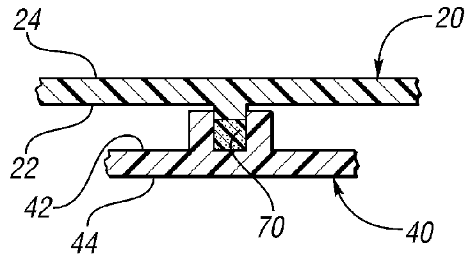
Figure 8:
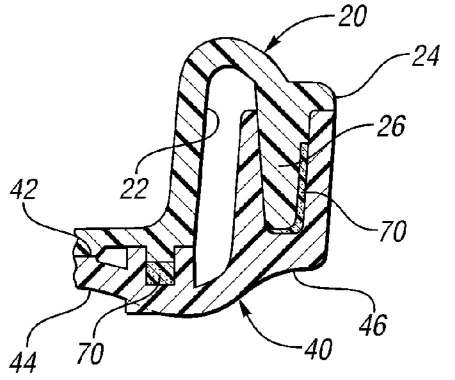
FIG. 8 is a side view, partially broken away and in cross section, of both rib and groove and tongue and groove mating portions of the front and back panels after electromagnetic welding.
Figure 9:
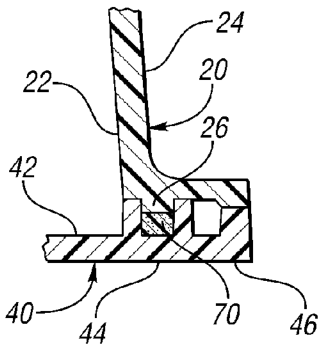
FIG. 9 is a side view, partially broken away and in cross section, of a rib and groove mating portions of the front and back panels after electromagnetic welding.

Referring to FIGS. 2, 3, 5 and 5*b*, the system or assembly 12 includes an elongated front panel, generally indicated at 20, having inner and outer surfaces 22 and 24, respectively, and a plurality of mating portions including an outer boundary mating portion 26 formed about the perimeter of the front panel 20, a first interior mating portion 28 (FIGS. 6 and 6*b*) extending between opposite sides of the outer boundary mating portion 26 at a first end 30 of the front panel 30 and a second interior mating portion 26 extending between opposite sides of the outer boundary mating portion 26 at a second end 32 of the front panel 20. The front panel 20 has a first sound opening 34 at the first end 30 and a second sound opening 36 at the second end 32. The first outer surface 24 is typically a class-A surface.

Figure 2:
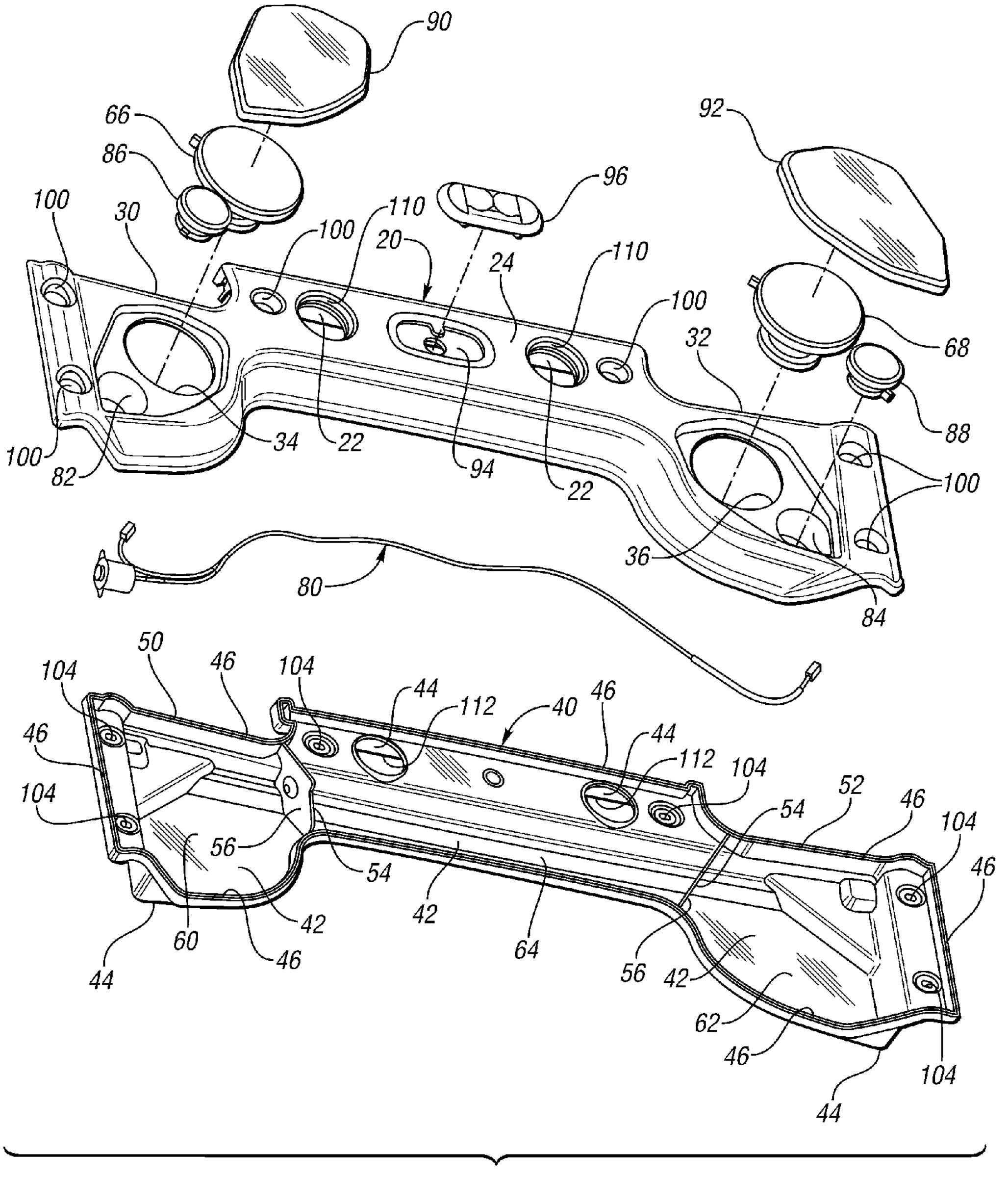
FIG. 2 is an exploded perspective view of a speaker system or sound bar assembly constructed in accordance with at least one embodiment of the present invention.
Figure 3:
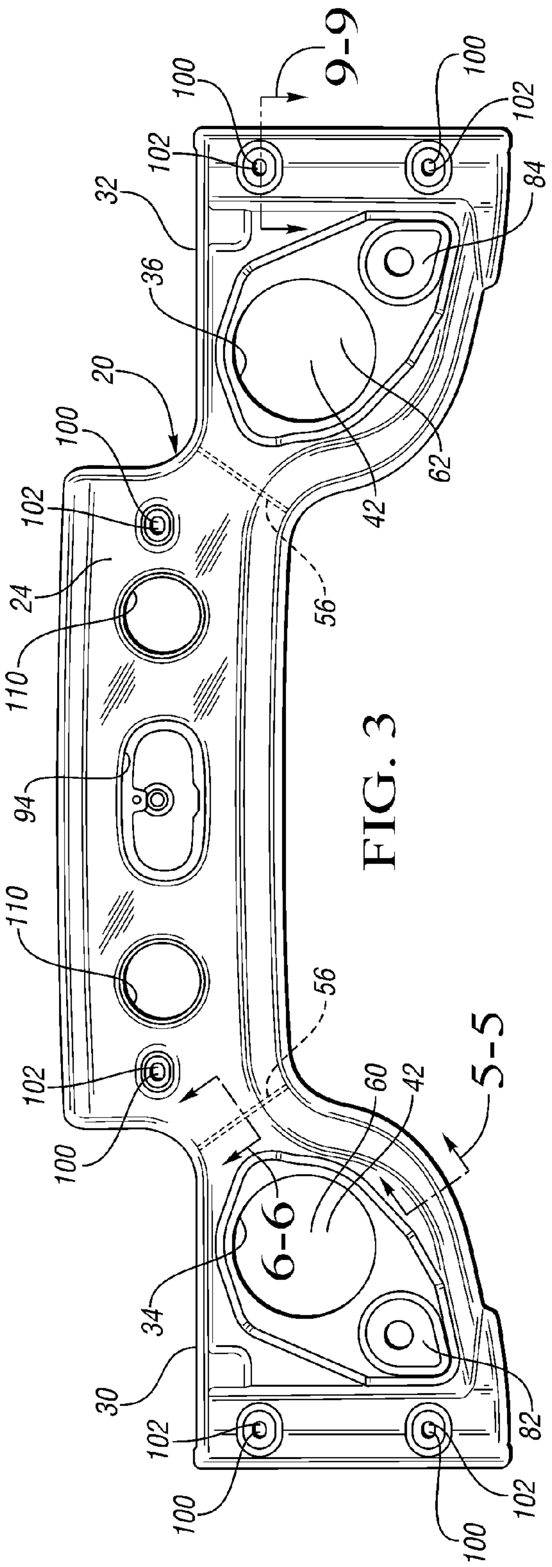
FIG. 3 is a top plan view of the speaker system or assembly of FIG. 2 without speaker or light units.
Figure 10:
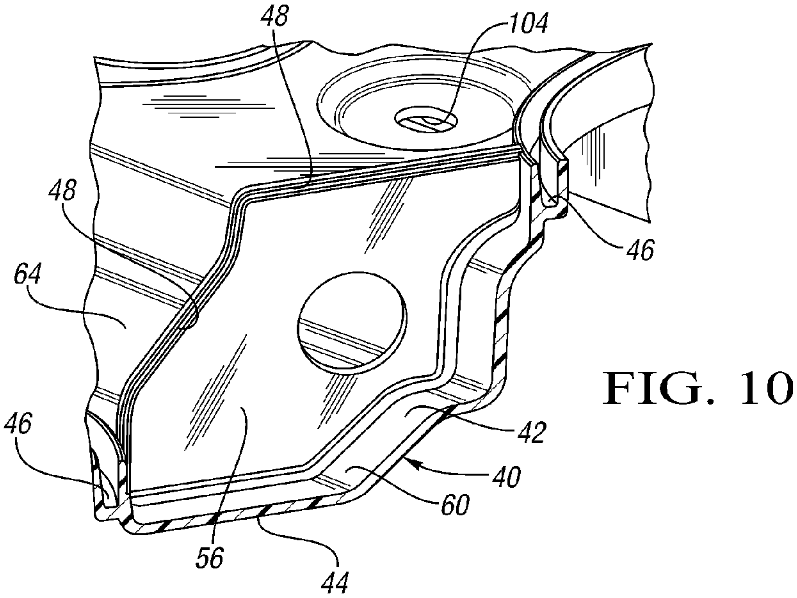
FIG. 10 is a side schematic view, partially broken away and in cross section, of the bottom panel and illustrating an interior mating portion forward on a rib and extending between opposite sides of an outer boundary mating portion of the panel.

Still referring to FIGS. 2 and 3 and also to FIG. 10, the system or assembly 12 also includes an elongated back panel generally included at 40, having inner and outer surfaces, 42 and 44, respectively, and a plurality of mating portions that oppose corresponding mating portions of the front panel 20. The mating portions of the back panel 40 includes an outer boundary mating portion 46 formed about the perimeter of the back panel 40, a first interior mating portion 48 extending between opposite sides of the outer boundary mating portion 46 of the back panel 40 and a second interior mating portion 48 extending between opposite sides of the outer boundary mating portion 46 at a second end 52 of the back panel 40. The first and second interior mating portions 48 are formed at the edges 54 of rib plates 56 integrally formed with the rest of the back panel 40. Opposing mating portions of the front and back panels 20 and 40, respectively, are fused or welded together to form outer boundary and interior joints, as shown in FIGS. 5*b*, 6*b*, 7*b*, 8, 9 and 11*c*, where the front and back panels 20 and 40, respectively, are joined. The front and back panels 20 and 40, respectively, are spaced apart at their first and second ends 30, 32, 50 and 52 to define first and second speaker compartments 60 and 62, respectively, separated by a central compartment 64.

As shown in the exploded perspective view of FIG. 2, the system or assembly 12 still further includes a first speaker unit 66 positioned in the first speaker compartment 60 and mounted to transmit sound through the first sound opening 34 and a second speaker unit 68 positioned in the second speaker compartment 62 and mounted to transmit sound through the second sound opening 36. The speaker compartments 60 and 62 are acoustically isolated from one another by the interior joints provided by the fused or welded interior mating portions 28 and 48. Each of the compartments 60, 62 and 64 is air or pressure-tight to acoustically isolate the speaker compartments 60 and 62.

The front panel 20 is preferably formed as a unitary molded part from a thermoplastic such as a polyolefin with a talc filler in an injection molding process. In like fashion, the back panel 40 is preferably formed as a unitary molded part from a thermoplastic (such as a filled polyolefin) in an injection molding process. The thermoplastic of the front panel 20 is preferably compatible to be electromagnetically welded with the thermoplastic of the back panel 40. The mating portions of the panels 20 and 40 are thermoplastic mating portions.

Figure 11A:
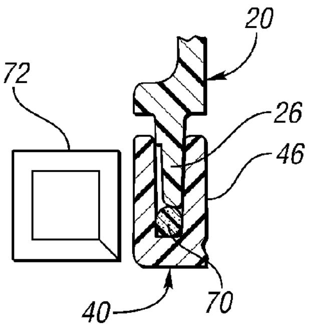
FIGS. 11*a* through 11*c* are schematic views showing an example electromagnetic welding or bonding process before panel or part joining, during part joining and after part joining, respectively.
Figure 11B:
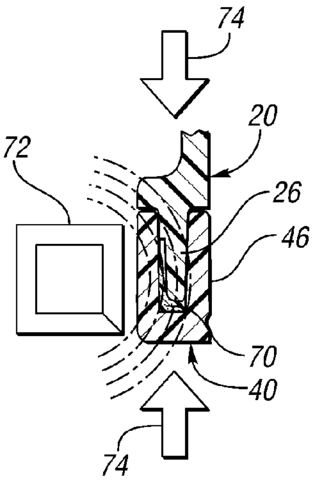
Figure 11C:
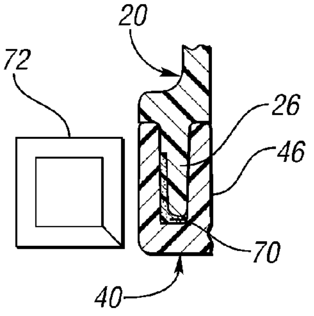

The system 12 further includes a weld 70 disposed in spaces between opposing mating portions of the front and back panels 20 and 40, respectively. The weld 70 is defined by a thermoplastic electromagnetic material which, when melted and placed under pressure, is caused to conform to the configuration of the spaces to bond to and secure together surfaces layers of the opposing mating portions at the spaces by polymer-to-polymer linkages, as shown in FIGS. 5*a* through 9 and FIGS. 11*a*-11*c*. As shown in FIG. 11*a*, before joining, the weld material 70 such as strips of thermoplastic electromagnetic material are deposited in the joints. The mating portions or parts are brought together and placed within a fixture containing a work coil 72. During joining, the coil 72 is activated to heat the weld material 70, causing the adjoining surfaces of the mating parts or portions to melt as shown in FIG. 11*b*. After joining and as shown in FIG. 11*c*, the weld material 70 has filled the joint. The process has fused the mating parts (i.e. the front and back panels, 20 and 40, respectively), resulting in polymer-to-polymer linkages therebetween at the mating portions.

Referring again to FIGS. 2 and 3, the front panel 20 has first and second depressions 82 and 84, respectively, at its outer surface 24 at the first and second ends 30 and 32, respectively, of the front panel 20. The system 10 further comprises a third speaker unit 86 positioned in the first depression 82 and a fourth speaker unit 88 positioned in the second depression 84. The first and second speaker units 66 and 68 may be bass/midrange speaker units and the third and fourth speaker units 86 and 88, respectively, may be higher frequency speaker units or tweeters. The first depression 82 is defined by bottom and side walls which separate the first depression 82 from the first speaker compartment 60. The second depression 84 is defined by bottom and side walls which separate the second depression 84 from the second speaker compartment 62.

The system 12 further includes grills 90 and 92 for covering the speaker units 86, 66, 68 and 88 at the first and second ends 30 and 32 of the front panel 20.

The front panel 20 has a recess 94 at its outer surface 24 between the first and second ends 30 and 32. The system 10 further includes a light unit 96 positioned in the recess 94 to emit light.

Figure 4:
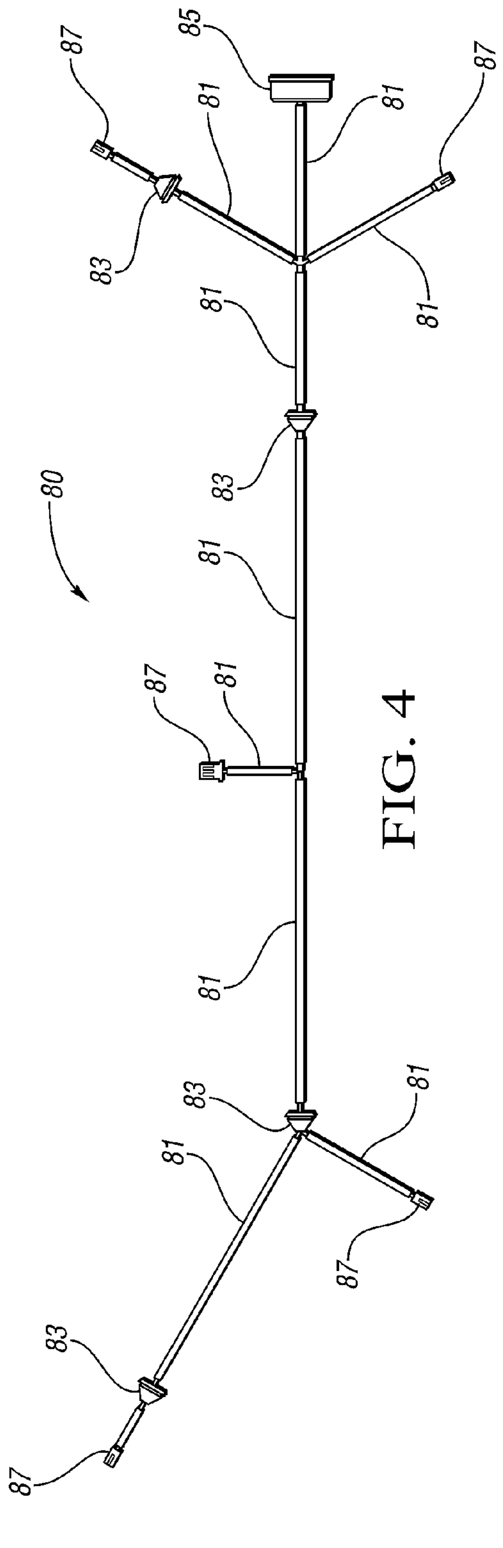
FIG. 4 is a schematic view of a wiring harness including wires, connectors and grommets for use in the system or assembly of FIGS. 2 and 3.
Figure 5A:
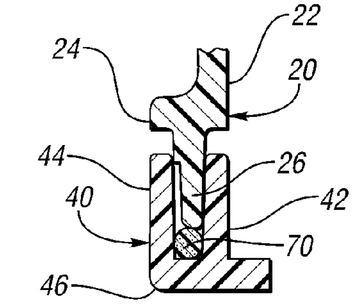
FIGS. 5*a* and 5*b* are side schematic views, partially broken away, of tongue and groove mating portions of the front and back panels of the system or assembly prior to and after, respectively, electromagnetic welding.
Figure 5B:
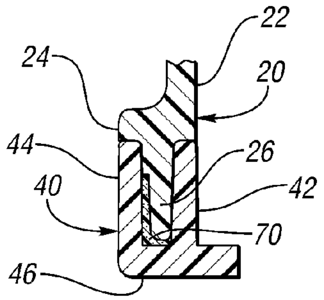

As shown in FIGS. 2 and 4, the system or assembly 12 further includes a wiring harness generally included at 80, routed to each of the speaker compartments 60 and 62 to couple electrical audio signals to each of the speaker units 66 and 68. The wiring harness 80 is routed to each of the compartments 60, 62 and 64, to each of the depressions 82 and 84 and to the recess 94 (through holes formed in the bottom walls of the depressions 82 and 84 and the recess 94) to couple electrical audio signals to each of the speaker units 86 and 88 and electrical power to the light unit 96. The wiring harness 80 includes a plurality of wires 81 and a plurality of interconnecting molded-in grommets 83 which seal the wiring harness 80 within holes in the walls 82 and 84 and the ribs 56. The wiring harness 80 also includes a multi-pin, main connector 85 adapted to be connected to a connector (not shown) coupled to the electrical system of the vehicle 10. The wiring harness 80 further includes a plurality of connectors 87 for connection to each of the speaker units 66, 68, 86 and 88 and the light unit 96.

The front panel 20 also preferably includes apertures 110 which are aligned with apertures 112 formed in the back panel 40. The aligned apertures 110 and 112 provide attachment locations for cups (not shown) which are secured to the front panel 20 and the roof 16 by bolts (not shown) which extend through the cups. Preferably, the panels 20 and 40 are fused or welded together about the aligned apertures 110 and 112 by the previously described weld material using the previously described electromagnetic weld process.

Preferably, the weld material 70 includes strips of thermoplastic electromagnetic weld material, such as EMAWELD® material, positioned in channels or grooves formed in the mating portions of the bottom panel 40 as shown in FIG. 11*a*.

As shown in FIG. 11*b*, an electromagnetic field is then established about the EMAWELD® material positioned in the channels or grooves and in the space between the mating portions of the front and back panels 20 and 40, respectively, for a time sufficient to melt the material. The molten material, in turn, melts surface layers of the melting portions of the front and back panels 20 and 40 which contact the molten material. This step can be accomplished by controllably energizing the electromagnetic transmission coils (use of which is shown in FIGS. 11*a*-11*c* at 72) coupled to an induction generator (not shown), such as an induction generator generally available from Emabond® systems, a division of Ashland Chemical Company, of Norwood, N.J.

The adjacent surfaces of the mating portions are forced together as indicated by arrows 74 in FIG. 11*b* to cause the molten material to flow within the channels and the space between the mating portions of the front and back panels 20 and 40, respectively, to further cause surface layers of the mating portions to melt.

The molten material and the molten surface layers are allowed to cool and solidify as shown in FIG. 11*c*. In this way, the material fuses with the mating portions causing polymer-to-polymer linkages. This provides extremely strong bonds considering the relatively small surface area by which the front panel 20 is secured to the back panel 40.

In this way, the welds formed by the thermoplastic electromagnetic material provide very strong yet narrow bonds between the front and back panels 20 and 40, respectively. These welds can be located very close to the wiring harness 80 without damaging the wiring harness 80 during manufacturing. The bonds between the front and back panels 20 and 40, respectively, even though occupying a relatively small amount of surface area, are strong enough to maintain the acoustical isolation between the speaker compartments 60 and 62 despite vibration and extreme weather conditions within the passenger compartment of the vehicle 10.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A speaker system having a plurality of speaker units and improved sound quality, the system comprising:

a front panel having inner and outer surfaces and a plurality of mating portions including an outer boundary mating portion formed about the perimeter of the front panel, a first interior mating portion extending between opposite sides of the outer boundary mating portion at a first end of the front panel and a second interior mating portion extending between opposite sides of the outer boundary mating portion at a second end of the front panel; the front panel having a first sound opening at the first end and a second sound opening at the second end;

a back panel having inner and outer surfaces and a plurality of mating portions that oppose corresponding mating portions of the front panel, the mating portions of the back panel including an outer boundary mating portion formed about the perimeter of the back panel, a first interior mating portion extending between opposite sides of the outer boundary mating portion of the back panel at a first end of the back panel, and a second interior mating portion extending between opposite sides of the outer boundary mating portion of the back panel at a second end of the back panel, wherein opposing mating portions of the front and back panels are fused or welded together to form outer boundary and interior joints where the front and back panels are joined, the front and back panels being spaced apart at their first and second ends to define first and second speaker compartments, respectively, separated by a central compartment; and a first speaker unit positioned in the first speaker compartment and mounted to transmit sound through the first sound opening and a second speaker unit positioned in the second speaker compartment and mounted to transmit sound through the second sound opening wherein the speaker compartments are acoustically isolated from one another by the interior joints;

wherein the front panel has a plurality of depressions; each of the depressions being at least partially defined by a bottom wall having an opening and wherein the back panel has a plurality of openings aligned with the openings in the bottom walls when the front and back panels are joined together and wherein the system further comprises a plurality of fasteners which extend through the aligned openings to mount the system.

2. The system as claimed in claim 1, wherein each of the compartments is air or pressure-tight to acoustically isolate the speaker compartments.

3. The system as claimed in claim 1, wherein the front panel is formed as a unitary molded part from a thermoplastic in an injection molding process.

4. The system as claimed in claim 3, wherein the back panel is formed as a unitary molded part from a thermoplastic in an injection molding process.

5. The system as claimed in claim 4, wherein the thermoplastic of the front panel is compatible to be electromagnetically welded with the thermoplastic of the back panel.

6. The system as claimed in claim 1, wherein the mating portions of the panels are thermoplastic mating portions and wherein the system further comprises a weld disposed in spaces between opposing mating portions of the front and back panels and being defined by a thermoplastic electromagnetic material which, when melted and placed under pressure, is caused to conform to the configuration of the spaces to bond to and secure together surfaces layers of the opposing mating portions at the spaces by polymer-to-polymer linkages.

7. The system as claimed in claim 1, wherein the outer surface of the front panel is a class-A surface and the outer surface of the back panel is a mounting surface.

8. The system as claimed in claim 1, further comprising a wiring harness disposed in the central compartment and routed to each of the speaker compartments to couple electrical audio signals to each of the speaker units.

9. The system as claimed in claim 1, the front panel has first and second depressions at its outer surface at the first and second ends, respectively, of the front panel and wherein the system further comprises a third speaker unit positioned in the first depression and a fourth speaker unit positioned in the second depression.

10. The system as claimed in claim 9, wherein the first depression is defined by bottom and side walls which separate the first depression from the first speaker compartment.

11. The system as claimed in claim 10, wherein the second depression is defined by bottom and side walls which separate the second depression from the second speaker compartment.

12. The system as claimed in claim 9, further comprising a wiring harness disposed in the central compartment and routed to each of the speaker compartments and to each of the depressions to couple electrical audio signals to each of the speaker units.

13. The system as claimed in claim 1, further comprising grills for covering the speaker units at the first and second ends of the front panel.

14. The system as claimed in claim 1, wherein the front panel has a recess at its outer surface between the first and second ends and wherein the system further comprises a light unit positioned in the recess to emit light.

15. The system as claimed in claim 1, wherein the panels are fused or welded together about the aligned openings.

16. A speaker system having a plurality of speaker units and improved sound quality for use in a vehicle, the system comprising:

a front panel having inner and outer surfaces and a plurality of mating portions including an outer boundary mating portion formed about the perimeter of the front panel, a first interior mating portion extending between opposite sides of the outer boundary mating portion at a first end of the front panel and a second interior mating portion extending between opposite sides of the outer boundary mating portion at a second end of the front panel; the front panel having a first sound opening at the first end and a second sound opening at the second end;

a back panel having inner and outer surfaces and a plurality of mating portions that oppose corresponding mating portions of the front panel, the mating portions of the back panel including an outer boundary mating portion formed about the perimeter of the back panel, a first interior mating portion extending between opposite sides of the outer boundary mating portion of the back panel at a first end of the back panel, and a second interior mating portion extending between opposite sides of the outer boundary mating portion of the back panel at a second end of the back panel, wherein opposing mating portions of the front and back panels are fused or welded together to form outer boundary and interior joints where the front and back panels are joined, the front and back panels being spaced apart at their first and second ends to define first and second speaker compartments, respectively, separated by a central compartment; and a first speaker unit positioned in the first speaker compartment and mounted to transmit sound through the first sound opening and a second speaker unit positioned in the second speaker compartment and mounted to transmit sound through the second sound opening wherein the speaker compartments are acoustically isolated from one another by the interior joints;

wherein the front panel has a plurality of depressions; each of the depressions being at least partially defined by a bottom wall having an opening and wherein the back panel has a plurality of openings aligned with the openings in the bottom walls when the front and back panels are joined together and wherein the system further comprises a plurality of fasteners which extend through the aligned openings to mount the system.

17. The system as claimed in claim 16, wherein each of the compartments is air or pressure-tight to acoustically isolate the speaker compartments.

18. An overhead sound bar assembly having improved sound quality for use in a sport utility vehicle, the assembly comprising:

a front panel having inner and outer surfaces and a plurality of mating portions including an outer boundary mating portion formed about the perimeter of the front panel, a first interior mating portion extending between opposite sides of the outer boundary mating portion at a first end of the front panel and a second interior mating portion extending between opposite sides of the outer boundary mating portion at a second end of the front panel; the front panel having a first sound opening at the first end and a second sound opening at the second end;

a back panel having inner and outer surfaces and a plurality of mating portions that oppose corresponding mating portions of the front panel, the mating portions of the back panel including an outer boundary mating portion formed about the perimeter of the back panel, a first interior mating portion extending between opposite sides of the outer boundary mating portion of the back panel at a first end of the back panel, and a second interior mating portion extending between opposite sides of the outer boundary mating portion of the back panel at a second end of the back panel, wherein opposing mating portions of the front and back panels are fused or welded together to form outer boundary and interior joints where the front and back panels are joined, the front and back panels being spaced apart at their first and second ends to define first and second speaker compartments, respectively, separated by a central compartment; and a first speaker unit positioned in the first speaker compartment and mounted to transmit sound through the first sound opening and a second speaker unit positioned in the second speaker compartment and mounted to transmit sound through the second sound opening wherein the speaker compartments are acoustically isolated from one another by the interior joints;

wherein the front panel has a plurality of depressions; each of the depressions being at least partially defined by a bottom wall having an opening and wherein the back panel has a plurality of openings aligned with the openings in the bottom walls when the front and back panels are joined together and wherein the system further comprises a plurality of fasteners which extend through the aligned openings to mount the system.

19. The assembly as claimed in claim 18, wherein each of the compartments is air or pressure-tight to acoustically isolate the speaker compartments.

* * * * *